United States Patent [19]

Herbermann

[11] Patent Number: 5,383,738
[45] Date of Patent: Jan. 24, 1995

[54] BALL JOINTED LINKS

[75] Inventor: Alfred F. Herbermann, Ann Arbor, Mich.

[73] Assignee: Syron Engineering & Manufacturing Corp., Saline, Mich.

[21] Appl. No.: 177,091

[22] Filed: Jan. 3, 1994

Related U.S. Application Data

[63] Continuation of Ser. No. 840,420, Feb. 24, 1992, abandoned.

[51] Int. Cl.6 ............................................. F16C 11/06
[52] U.S. Cl. ............................................. 403/56; 403/90; 403/373; 248/288.5; 285/184
[58] Field of Search ................. 403/56, 90, 141–143, 403/344, 341, 41, 373, 53, 76, 110, 338; 248/288.5, 181, 481, 276; 285/184

[56] References Cited

U.S. PATENT DOCUMENTS

| 354,976 | 12/1886 | Field | 248/484 |
|---|---|---|---|
| 1,186,428 | 6/1916 | Newman | 248/276 |
| 1,500,921 | 7/1924 | Bramson et al. | 403/56 X |
| 1,779,057 | 10/1930 | Tolmach | 403/142 X |
| 2,141,945 | 12/1938 | Tweedale | 403/56 X |
| 2,326,941 | 8/1943 | Heitner | 403/373 X |
| 2,420,621 | 5/1947 | Ricks | 403/56 |
| 2,439,009 | 4/1948 | Kujawski | 403/56 |
| 2,752,726 | 1/1950 | Calverley | 446/99 |
| 3,606,407 | 9/1971 | Pendergast | 403/341 X |
| 4,225,258 | 9/1980 | Thompson | 403/56 |
| 4,382,572 | 5/1983 | Thompson | 248/484 |
| 4,471,595 | 9/1984 | Lanzafame | 52/584 |
| 4,601,603 | 7/1986 | Nakayama | 403/143 |
| 4,603,887 | 8/1986 | Mayfield et al. | 403/344 X |
| 4,648,733 | 3/1987 | Merkt | 403/56 |
| 4,898,490 | 2/1990 | Herbermann et al. | 403/56 |
| 4,941,481 | 7/1990 | Wagenknecht | 403/90 X |
| 4,974,802 | 12/1990 | Hendren | 403/90 X |
| 4,980,805 | 12/1990 | Maglica et al. | 403/141 X |

FOREIGN PATENT DOCUMENTS

| 2660714 | 10/1991 | France | 403/56 |
|---|---|---|---|
| 2655819 | 3/1978 | Germany | 248/276 |
| 410825 | 5/1934 | United Kingdom | 403/90 |

Primary Examiner—Randolph A. Reese
Assistant Examiner—Harry C. Kim
Attorney, Agent, or Firm—Howard & Howard

[57] ABSTRACT

An improved ball jointed link includes a male ball at one end which is received in a female socket in an adjacent link. A central aperture extends through each of the links between the male ball and the female socket. The male ball is preferably more resistant to radially inward deformation than the female socket. A clamp which secures adjacent links together may thus be tightened to support relatively great loads. The male ball may have a greater wall thickness than the female socket, or may be formed of hardened metal. In a further feature, the clamps used to secure adjacent links have a ledge which abuts an axially forwardmost edge of the female socket to ensure the clamp is properly positioned on the links.

20 Claims, 3 Drawing Sheets

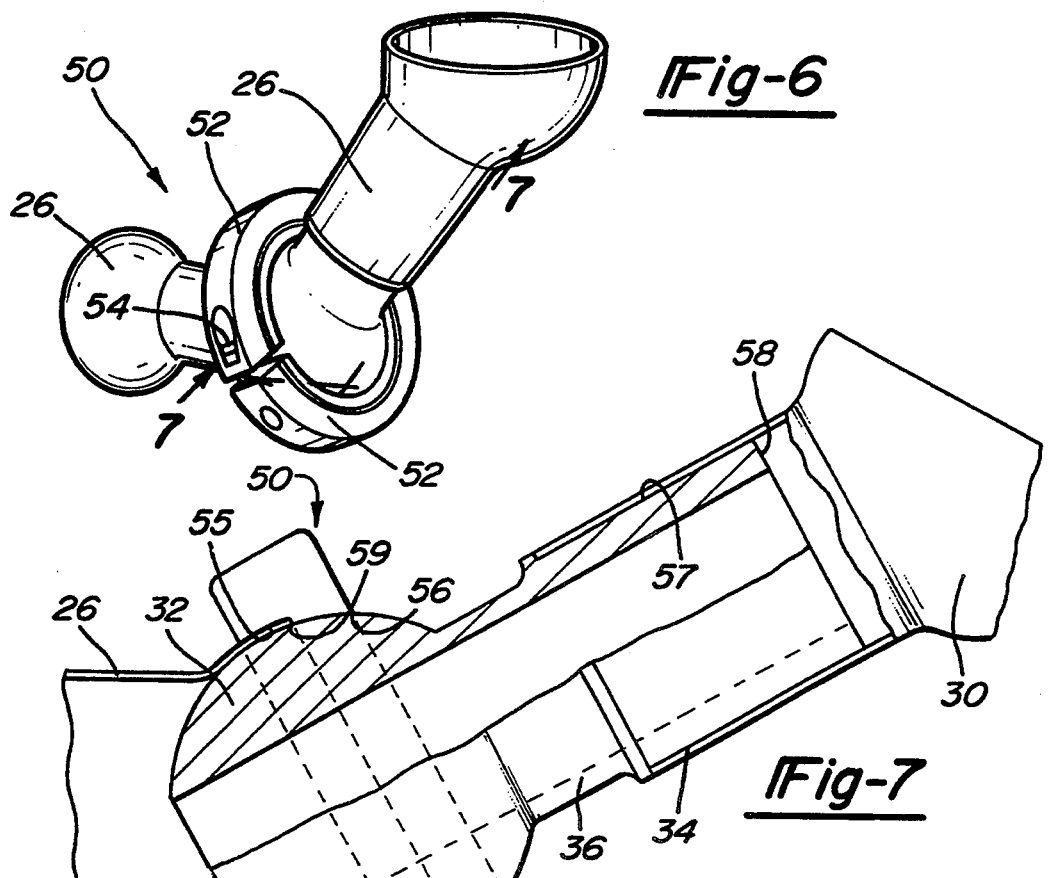

BALL JOINTED LINKS

This is a continuation of copending application(s) Ser. No. 07/840,420 filed on Feb. 24, 1992, now abandoned.

BACKGROUND OF THE INVENTION

This invention discloses an improvement in ball jointed links which are used to support a structure.

In the prior art ball jointed links are often used to support members such as a gripper hand from a mount structure. Ball jointed links preferably having a central aperture for supply lines, such as electric or hydraulic lines, to pass through the links and communicate through the mount structure to the supported member.

Once such prior art link is disclosed in U.S. Pat. No. 4,898,490. In this patent, a plurality of ball jointed links are disclosed which support a gripper hand at a distance from a mount structure. This system has proven successful, but it is desirable to further improve upon this system, and make it better equipped to support heavier loads.

Further, in the prior art adjacent ball jointed links are preferably connected by clamps. It may have been difficult to ensure that the clamps are properly aligned on the links, and thus difficult to ensure a secure connection.

SUMMARY OF THE INVENTION

A disclosed link has a male ball at one end and a female socket at the other end. Either the male ball or the female socket is constructed such that it is more resistant to radially inward deformation than tile other. Thus, when a clamp is tightened to secure the socket on the ball, it is less likely that the two will be deformed radially inwardly. The clamp may then be securely tightened to support relatively heavy loads. In a disclosed embodiment of the present invention, the male ball may be formed of a harder material than the female socket, and may have a greater wall thickness.

The link is preferably formed of two members. The male ball is in a first member formed of a hardened metal, and having a relatively great wall thickness. The female socket is in a second member formed of a metal of lesser hardness and smaller wall thickness. Since the male ball is more resistant to radially inward deformation, the female socket need not be. Thus, it is not necessary that the female socket be formed of expensive, hardened metal.

In another feature of the present invention, an inventive clamp is disclosed which is tightened to secure tile female socket on the male ball. The clamp has a radially inner ledge abutting an axial edge of the female socket to ensure that the clamp is properly positioned relative to the female socket and male ball. The inventive clamp thus ensures a secure connection of adjacent links.

These and other features of the present invention can be best understood from the following specification and drawings, of which the following is a brief description.

BRIEF DESCRIPTION OF THE DRAWINGS

FIG. 6 is a perspective view showing the use of a second embodiment clamp according to the present invention.

FIG. 7 is a cross-sectional view along line 7—7 as shown in FIG. 6.

FIG. 8 is an end view of the second embodiment clamp.

DETAILED DESCRIPTION OF A PREFERRED EMBODIMENT

Figure 1:
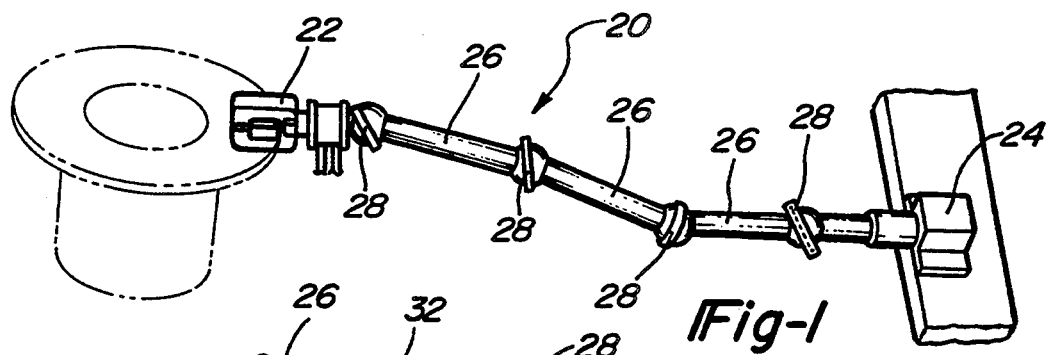
FIG. 1 is a perspective view of a system embodying the present invention.

A support system 20 illustrated in FIG. 1 includes a gripper hand 22 mounted at a distance from a mount structure 24. A plurality of ball jointed links 26 connect gripper hand 22 to mount structure 24. Gripper hand 22 may be a robotic manipulator, and links 26 may carry electric or hydraulic power supply lines to, and from, gripper hand 22. As shown, a plurality of clamps 28 connect and secure adjacent links 26.

Figure 2:
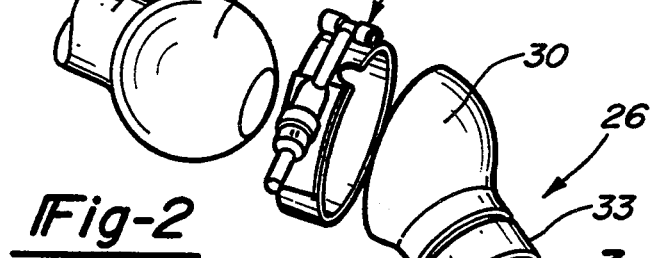
FIG. 2 is a partial exploded view of the system shown in FIG. 1.

As shown in FIG. 2, each link 26 has a female socket 30 at one axial end and a male ball 32 at an opposed axial end. Female socket 30 defines a part spherical inner peripheral surface, and male ball 32 defines a part spherical outer peripheral surface. A central portion 33 of each link 26 is formed from an extension 34 extending from female socket 30, and an extension 36 extending from male ball 32.

Figure 3:
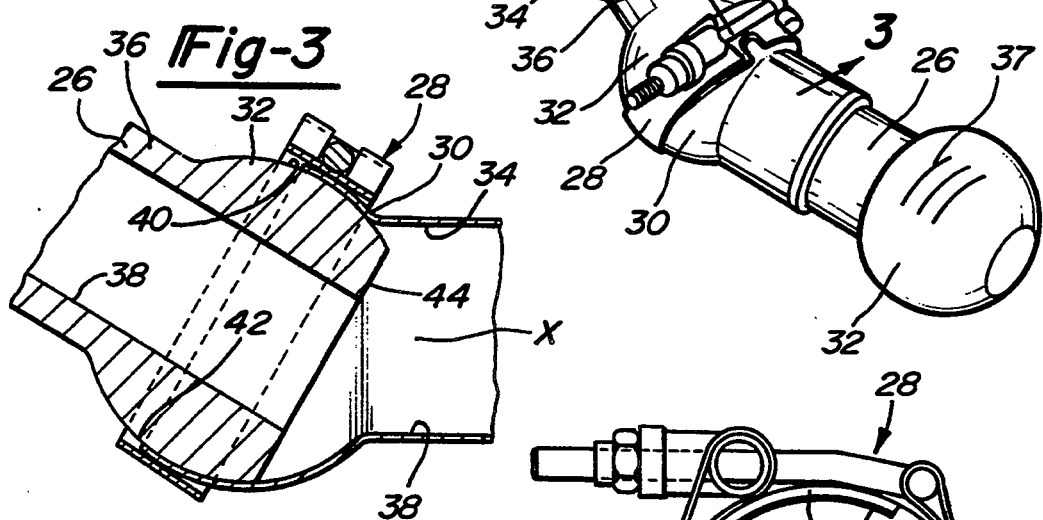
FIG. 3 is a cross-sectional view along line 3—3 as shown in FIG. 2.

As shown in FIG. 3, aperture 38 extends through male ball 32, extension 36, female socket 26 and extension 34 such that power lines can reach gripper hand 22 through the plural connected links 26. Male ball 32 and extension 36 preferably have of a greater wall thickness than female socket 30. Extension 34 preferably also has a thinner wall section adjacent female socket 30. In this way, the relative angles of adjacent links 26 may vary as shown, such that an axially forwardmost edge 44 of male ball 32 may extend into a portion of extension 34. If extension 34 was of the same wall thickness as extension 36, there may be insufficient clearance for edge 44 of male ball 32 to pivot within extension 34.

Although male ball 32 is shown having a greater thickness than socket 30, male ball 32 may simply be formed of a harder metal than female socket 30. When clamp 28 is tightened about female socket 30 and male ball 32, it is less likely that the connection will collapse radially inwardly. Clamp 28 can be tightened to a greater degree, and links 26 can support greater weight. Further, since only male ball 32 is formed of the thicker material, it is not necessary for additional material, or expensive hardened material, to be used on female socket 30 to provide additional strength. This reduces the weight and expense of link 26.

Further, the outer surface of male ball 32 is preferably roughened as partially shown at 37 in FIG. 2. In one embodiment, a series of rings 37 extend slightly radially outwardly from the outer surface of male ball 32. When clamp 28 is tightened, female socket 30, which is relatively radially deformable is squeezed onto this toughened surface. This reduces any tendency to slip between male ball 32 and female socket 30.

Clamp 28 has a ledge 40 which abuts an axially forwardmost edge 42 of female socket 30. This defines a stop which ensures that clamp 28 is properly positioned on female socket 30 and male ball 32 when tightened. As also shown, edge 42 of female socket 30 defines a plane which is skew relative to a plane perpendicular to a central axis X of link 26. That is, edge 42 defines a plane. A second plane drawn parallel to axis X would be at an acute angle relative to the plane defined by edge 42. This increases the relative angles adjacent links 26 may define with each other. When used with a female socket having this skew edge, ledge 40 is particularly valuable to ensure proper clamp positioning.

Figure 4:
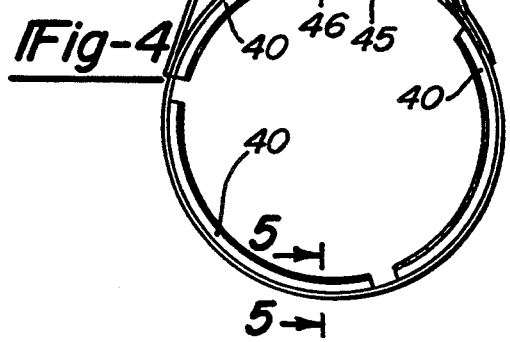
FIG. 4 is an end view of a first embodiment clamp according to the present invention.

FIG. 4 is an end view of a first embodiment clamp 28. A band 45 defines a first inner peripheral surface 46 over a portion of its axial length, and ledge 40 extends radially inwardly from surface 46. Further as shown, ledge 40 may be formed by a plurality of sections to facilitate its insertion onto the adjacent links 26 prior to tightening.

Figure 5:
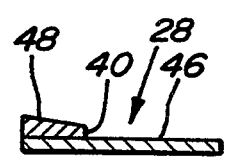
FIG. 5 is a cross-sectional view along line 5—5 as shown in FIG. 4.

As shown in FIG. 5, band 45 consists of radially outer surface 46, and ledge 40, extending to a radially inner surface 48. In use, surface 46 overlies female socket 30 while surface 48 overlies male ball 32.

FIG. 6 shows a second embodiment clamp 50 which is formed of two semi-cylindrical members 52 connected by two spaced bolts 54. Bolts 54 are tightened to draw member 52 together to secure adjacent links 26 together.

As shown in FIG. 7, a ledge 59, similar to ledge 40, abuts an axially forwardmost edge 42 of female socket 30. As also shown, a radially inner surface 55 overlies a portion of female socket 30 while a radially inner surface 56 overlies a portion of male ball 32. This ensures that clamp 50 is properly aligned on adjacent links 26.

As also shown in FIG. 7, extension 36 from male ball 32 has a portion 57 which is received within extension 34. An end 58 of portion 57 is spaced a minimal axial distance from female socket 30 such that there is clearance for a male ball 32 to pivot in female socket 30 as described with reference to FIG. 3.

As shown in FIG. 8, the cylindrical clamp is tightened together by tightening two spaced bolts 54.

Figure 9:
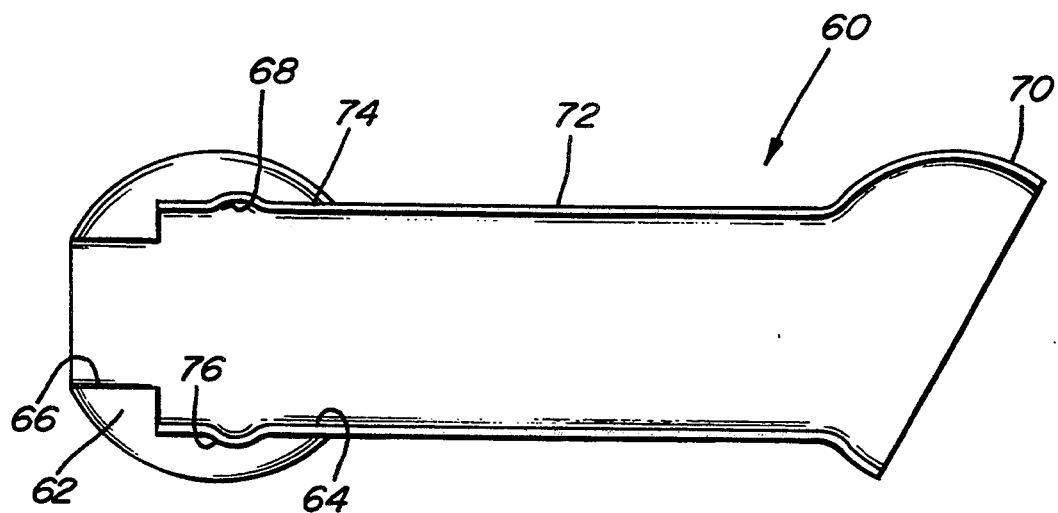
FIG. 9 is a cross-sectional view through a second embodiment link according to the present invention.

FIG. 9 shows a second embodiment link 60. Male ball 62 is formed with a stepped aperture with radially greater aperture portion 64 and radially smaller aperture portion 66. A circumferential groove 68 is formed in aperture portion 64. Female socket 70 is formed with an extension 72 having portion 74 received within aperture portion 64. A bead 76 extends radially outwardly of portion 74, and into groove 68 to secure male ball 62 on extension 72.

Preferably, portion 74 is inserted into aperture portion 64, and bead 76 is then deformed into groove 68. An adhesive may also be used to secure male ball 62 on portion 74.

Although the male ball is disclosed as having a greater wall thickness than the female socket, this is not necessarily required. As an alternative, the male ball may simply be formed of a harder material than the female socket. The inventive features of this invention extend to any ball jointed link system wherein a link with a central aperture has male and female members, and wherein one of the male and female members is more resistant to radially inward deformation than the other. In one embodiment, the female socket was formed of aluminum, with the male ball formed of a hardened aluminum.

Preferred embodiments of the present invention have been disclosed, however, a worker of ordinary skill in the art would recognize that certain modifications would come within the scope of this invention. For that reason, the following claims should be studied in order to determine the true scope and content of this invention.

I claim:

1. A link element comprising:
a body extending along an axis between two ends, an aperture extending through said body between said ends, one of said ends being configured as a generally spherical male ball, said male ball having an irregular outer surface, the other of said ends being configured as a female socket, said female socket having an inner peripheral surface spaced approximately the same distance from said axis as an outer peripheral surface of said male ball;
said male ball being formed of a harder material than said female socket;
said male ball having a wall thickness between said outer peripheral surface and said aperture which is greater than the wall thickness of said female socket between said inner peripheral surface and an outer peripheral surface of said female socket; and
a central cylindrical extension connecting said male ball and said female socket, and a portion of said cylindrical extension adjacent said female socket having a smaller wall thickness than said male ball, said smaller wall thickness of said cylindrical extension extending from said female socket and towards said male ball, such that said male ball has a greater wall thickness than said cylindrical extension or said female socket.

2. A link as recited in claim 1, wherein said male ball and said female socket are formed as two members.

3. A link as recited in claim 2, wherein said female socket has an extension received in a male ball aperture portion.

4. A link as recited in claim 3, wherein said male ball aperture portion has a circumferential groove at an intermediate axial location and said extension has a bead extending radially outwardly of the remainder of said extension to retain said male ball on said extension.

5. A link as recited in claim 1, wherein said irregular outer surface is formed by a plurality of spaced rings.

6. A link as recited in claim 1, wherein said female socket is formed by a one-piece member having portions extending over 360 degrees about a central axis of said body.

7. A structure adapted to support a load comprising:
a plurality of links, each of said links having a body extending along a central axis between axial ends, a central aperture extending through said links between said ends, a male ball at a first axial end of said body, a female socket at the second axial end of said body, said female socket having an inner surface corresponding to an outer surface of said male ball; and
said male balls being received within female sockets of an adjacent link, a clamp secured to an outer surface of said female socket to fix said adjacent links, and said male balls being formed of a harder material than said female socket such that said male ball having a greater resistance to radially inward deformation than said female sockets from said clamp.

8. A structure as recited in claim 7, wherein said clamp contacting both a portion of said female socket and a portion of said outer surface of said male ball, said clamp having an inner peripheral surface with a first section extending radially inwardly from a second section, a ledge portion extending generally perpendicular between said first and second clamp sections, said ledge portion abutting an axially outermost edge of said female socket.

9. A structure as recited in claim 8, wherein said clamp is formed of two half-cylindrical sections which are tightened together to engage said clamp, and secure said adjacent links.

10. A structure as recited in claim 8, wherein said clamp is formed of a band which is tightened by a bolt to secure said adjacent links.

11. A structure as recited in claim 8, wherein a first plane is defined perpendicular to said axis of said body, said axially outermost edge of said female socket defining a second plane, and said second plane defining an acute angle with said first plane.

12. A structure as recited in claim 7, wherein said male ball has a wall thickness between said outer peripheral surface and said central aperture which is greater than the wall thickness of said female socket between said inner peripheral surface and an outer peripheral surface of said female socket.

13. A structure as recited in claim 7, wherein said male ball and said female socket are formed of two members, with an extension from one of said members being received with said central aperture of the other of said members.

14. A structure as recited in claim 13, wherein said female socket has a tubular extension received within said male ball.

15. A structure as recited in claim 7, wherein said male ball is formed with an irregular outer surface, and wherein said irregular outer surface includes a plurality of spaced rings.

16. A structure as recited in claim 7, wherein said female socket is formed by a one-piece member having portions extending over 360 degrees about said central axis of said link.

17. A structure adapted to support loads comprising: a plurality of links, each of said links having a body extending along a central axis between two axial ends, a central aperture extending through said links between said ends, a male ball at a first axial end of said body, a female socket at a second axial end of said body and having an inner surface corresponding to an outer surface of said male ball, a clamp disposed on adjacent links radially outwardly of said female socket, with said clamp having at least two ends which are drawn in opposed circumferential directions as said clamp is tightened, said clamp being tightened radially inwardly as said ends are drawn in opposed directions for contacting both a portion of said female socket and a portion of said outer surface of said male ball, said clamp having an inner peripheral surface with a first section contacting said male ball, and a second section which contacts said female socket, said second section being spaced radially outwardly from said first section, a ledge portion extending generally perpendicular to an axis of said clamp at a position axially between said first and second sections said ledge portion being tightened radially inwardly when said ends are drawn in opposed directions, said ledge portion abutting an axially outer-most edge of said female socket.

18. A structure as recited in claim 17, wherein said clamp is formed of two half-cylindrical sections which are tightened together to engage said clamp, and secure said adjacent links.

19. A structure as recited in claim 17, wherein said clamp is formed of a band which is tightened by a bolt to secure said adjacent links.

20. A structure as recited in claim 17, wherein a first plane is defined perpendicular to said axis of said body, said axially outermost edge of said female socket defining a second plane, and said second plane defining an acute angle with said first plane.

* * * * *